(12) United States Patent
Nylund et al.

(10) Patent No.: US 6,275,557 B2
(45) Date of Patent: *Aug. 14, 2001

(54) NUCLEAR FUEL ASSEMBLY (75) Inventors: Olov Nylund; Bo Fredin, both of Västerås; Sture Helmersson, Kolbäck, all of (SE)

(73) Assignee: ABB Atom AB, Vasteras (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/202,496
(22) PCT Filed: Jun. 18, 1997
(86) PCT No.: PCT/SE97/01081
 § 371 Date: Feb. 11, 1999
 § 102(e) Date: Feb. 11, 1999
(87) PCT Pub. No.: WO97/49092
 PCT Pub. Date: Dec. 24, 1997

(30) Foreign Application Priority Data

Jun. 20, 1996 (SE) ................................................ 9602452

(51) Int. Cl.$^7$ .............................. G21C 3/30; G21C 3/18; G21C 5/18
(52) U.S. Cl. .......................... 376/433; 376/420; 376/428; 376/451; 376/455
(58) Field of Search .................................. 376/420, 428, 376/445, 433, 451, 455

(56) References Cited

U.S. PATENT DOCUMENTS

| 3,043,761 | * | 7/1962 | Reynolds | 204/193.2 |
|---|---|---|---|---|
| 3,274,067 | * | 9/1966 | Greebler et al. | 176/68 |
| 3,671,393 | * | 6/1972 | Williams | 176/73 |
| 3,679,545 | * | 7/1972 | Leirvik | 176/68 |
| 3,801,451 | * | 4/1974 | Scharf | 176/73 |
| 4,326,922 | * | 4/1982 | Ferrari et al. | 376/435 |
| 4,678,924 | * | 7/1987 | Loriot et al. | 29/407 |
| 5,162,097 | * | 11/1992 | Fennern | 376/433 |

FOREIGN PATENT DOCUMENTS

WO 96/20483 7/1996 (WO).

* cited by examiner

Primary Examiner—Charles T. Jordan
Assistant Examiner—Kyongtack K. Mun
(74) Attorney, Agent, or Firm—Connolly Bove Lodge & Hutz (57) ABSTRACT

The present invention relates to a fuel assembly with a substantially square cross section for a light-water reactor. The light-water reactor comprises a plurality of fuel rods (4) extending between a top tie plate (5) and a bottom tie plate (6). A fuel rod (4) comprises a cladding tube (7a) with a first and a second end which surround a column with fissionable material (7b). According to one aspect of the invention, at least one fuel rod (4) is provided with an axial gap (19) in the fissionable material (7b), such that fissionable material (7b) is arranged on both sides of the axial gap (19) in the fuel rod (4).

11 Claims, 6 Drawing Sheets

NUCLEAR FUEL ASSEMBLY

FIELD OF THE INVENTION

The present invention relates to a nuclear fuel assembly for a light water reactor with a substantially square cross section comprising a plurality of fuel rods extending between a top tie plate and a bottom tie plate.

BACKGROUND OF THE INVENTION

In a nuclear reactor, moderated by means of light water, the fuel exists in the form of fuel rods. Each fuel rod contains a stack of pellets of a nuclear fuel arranged in a cladding tube, a column of extruded fuel cylinders or an uninterrupted column of vibration-compacted powdered fuel. The cladding tube is normally made of a zirconium-base alloy. A fuel bundle comprises a plurality of fuel rods arranged in parallel with each other in a certain definite, normally symmetrical pattern, a so-called lattice. The fuel rods are retained at the top by a top tie plate and at the bottom by a bottom tie plate. To keep the fuel rods at a distance from each other and prevent them from bending or vibrating when the reactor is in operation, a plurality of spacers are distributed along the fuel bundle in the longitudinal direction. A fuel assembly comprises one or more fuel bundles, each one extending along the main part of the length of the fuel assembly.

Together with a plurality of other fuel assemblies, the fuel assembly is arranged in a core. The core is immersed in water which serves both as coolant and as neutron moderator. During operation, the water flows from below and upwards through the fuel assembly, whereby, in a boiling water light-water reactor, part of the water is transformed into steam. The percentage of steam increases towards the top of the fuel assembly. Consequently, the coolant in the lower part of the fuel assembly consists of water whereas the coolant in the upper part of the fuel assembly consists both of steam and of water. This difference between the upper and lower parts gives rise to special problems which must be taken into consideration when designing the fuel assembly.

This problem can be solved by achieving a flexible fuel assembly which, in a simple manner, may be given a shape in which the upper part of the fuel assembly differs from the lower part thereof such that optimum conditions can be obtained. A fuel assembly for a boiling water reactor with these properties is shown in International patent document PCT/SE95/01478 (Int. Publ. No. WO 96/20483). This fuel assembly comprises a plurality of fuel units stacked on top of each other, each comprising a plurality of fuel rods extending between a top tie plate and a bottom tie plate. The fuel units are surrounded by a common fuel channel with a substantially square cross section. A fuel assembly of this type may, in a simple manner, be given a different design in its upper and lower parts.

Also in a light-water reactor of pressurized-water type, it may be desirable to design the fuel assemblies such that each fuel assembly comprises a plurality of fuel units stacked on top of each other. As described above, each one of the fuel units then comprises a plurality of fuel rods extending between a top nozzle and a bottom nozzle. A fuel assembly for a pressurized-water reactor, however, comprises no fuel channel.

One factor which must be taken into consideration when designing such fuel units with a length on the order of 300–1500 millimeters is that fission gases are formed during nuclear fission. In addition, the column of fuel pellets expands because of the heat generated in the fuel pellets. To take care of the fission gases and the thermal expansion of the column of fuel pellets, a relatively large space, an axial gap, is normally formed above the uppermost fuel pellet in the cladding tube in known full-length fuel rods, that is, fuel rods with a length on the order of 4 meters. The axial gap has a length on the order of 200–300. The fission gases may thus diffuse to this axial gap and the column of fuel pellets may expand into this gap.

Another factor which must be taken into consideration when designing axial gaps is that the temperature of the cladding tube in this region is lower than in the rest of the cladding tube since no fuel pellet is arranged in the axial gap. A problem which may arise as a result of this is that hydrogen formed, inter alia, by corrosion of the cladding tube, which is of a zirconium-based alloy, and is taken up thereby, diffuses into this colder region. In the event that the concentration of hydrogen becomes too high in this region, hydrides are formed in the cladding material and cause embrittlement thereof. In a serious case, the cladding tube may burst and fissionable material may enter into the cooling water. The same type of problem may also arise in the regions between the pellets, that is, where a lower end of a fuel pellet makes contact with an upper end of an adjacent fuel pellet, and in the region between two fuel units stacked on top of each other. The risk of embrittlement due to too high a concentration of hydrogen increases, to a certain limit, with the size of the axial gap.

Released fission gas contributes to the temperature in the axial gap decreasing further. This is due to the fission gas deteriorating the thermal conductivity of the gas which is present in the axial gap. The same thing applies to the gas which is present in the gap between the fuel pellets and the cladding tube, in which case the difference in temperature between the outer surface of the pellets and the inner surface of the cladding tube increases.

It is known to reduce the release of fission gas in different ways. One such way is to provide one or more of the fuel pellets with through-holes in their axial directions. In this way, the temperature in the fuel pellet is lowered whereby the release of fission gas is reduced and the axial gap may be reduced. In this case, the axial gap may be limited on the order of a few millimeters in a rod with a length on the order of 300 millimeters, up to a few tens of millimeters for longer rods, to allow the thermal expansion of the column of fuel pellets. A disadvantage of pellets provided with through-holes is that they are complicated to manufacture. For that reason, it is desirable to arrange axial gaps in the fissionable material.

Still another factor which must be taken into consideration when designing axial gaps in a fuel rod is that local power peaks arise here. The power peaks arise due to the moderation in this region, where fissionable and neutron-absorbing material are missing, being very good. This results in the power in the pellets adjoining the axial gap becoming very high, that is, a power peak arises. The power peak grows with the size of the axial gap.

The object of the present invention is to provide a fuel assembly with a plurality of short fuel units with fuel rods formed with axial gaps in the fissionable material adapted to give rise to small power peaks only.

SUMMARY OF THE INVENTION

The present invention relates to a fuel assembly comprising a plurality of fuel rods, each having at least one axial gap for fission gases, formed during operation, and thermal expansion of the nuclear fuel.

The fuel assembly comprises a cladding and a stack of nuclear fuel pellets arranged therein. The cladding tube is sealed with a plug at each end, more particularly with a top plug and a bottom plug. The axial gaps in the fuel rods are arranged such that, in adjacently arranged fuel rods, they are disposed at axially separated levels. By avoiding to arrange axial gaps at the same levels in adjacently arranged fuel rods, the risk of high power peaks is reduced as a consequence of the good moderation in this region.

To further reduce the power peaks at the axial gaps, in one embodiment of the invention these gaps are distributed at a plurality of levels within one fuel rod. In this way, each one of the axial gaps may be made considerably smaller than if only one gap is arranged in the fuel rod.

To achieve the axial gaps at the desired level in the fuel rod, a spacer is arranged in the axial gap or gaps. The spacer is designed deformable in the axial direction. In this way, the column of fuel pellets is allowed, because of thermal expansion, to be extended into the axial gap or gaps while the spacer is being deformed. When the spacer has been deformed in the axial direction, it prevents, by friction against the wall of the cladding tube, axial gaps from arising in the upper part of the fuel rod also when the fuel pellets decrease in size because of densification. Alternatively, the spacer may be designed to be resilient, for example in the form of a spiral spring with the same function as described above.

By not arranging the axial gaps in a traditional manner, that is, above or below the column with the fissionable material in the fuel rods, the power peaks between two fuel units stacked on top of each other are reduced. The axial gaps are achieved by arranging a spacer at an arbitrary level in the column of fissionable material. To further reduce the power peaks in the upper and lower ends, respectively, of the fuel rods, that is, between two fuel units stacked on top of each other, the fuel pellets in these regions may be designed with a smaller diameter than the other fuel pellets. To avoid annular gaps between the fuel pellet and the cladding tube, that part of the fuel rod which surrounds the fuel pellet and the cladding tube is designed with a correspondingly smaller inner diameter which has the same extent in the axial direction as the fuel pellet. Alternatively, the fuel pellets in this region may be given a lower enrichment.

The advantage of the invention is that axial gaps comprising the spacers which may be placed in optional positions are avoided in the upper parts of the fuel rods. The region without fissionable material formed between two fuel units stacked on top of each other is thus reduced and hence also the local power peak which may arise in this region due to too good moderation.

Another advantage is that the necessary axial gap, by means of the spacers which may be located in optional positions, may be divided into a plurality of smaller axial gaps whereby the power peaks therein are reduced. At the same time, the risk of too high a concentration of hydrogen in the axial gaps is reduced.

At least to a certain extent, the spacer contributes to increase the temperature somewhat in the material surrounding the axial gap in comparison with the temperature of axial gaps without spacers. The increased temperature is due to the spacer conducting part of the heat, which is generated in the pellets facing the axial gap, to the cladding tube. By this increased temperature, the risk of the hydrogen concentration becoming too high in the axial gaps is further reduced.

Still another advantage is that the spacer, even at the time of manufacture of the fuel rods, may accumulate a certain length tolerance of the pellets column. This means that the requirement for the length tolerance of the individual fuel pellets is reduced.

DESCRIPTION OF THE PREFERRED EMBODIMENTS

Figure 1:
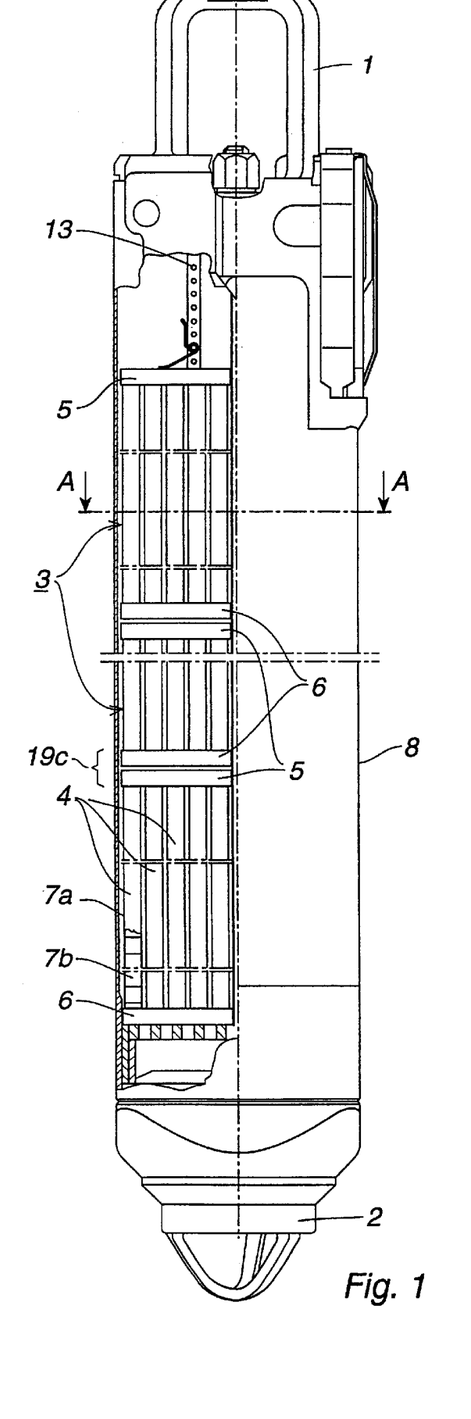
FIG. 1 shows in a vertical section a fuel assembly of a boiling water type with short fuel units.

FIG. 1 shows a fuel assembly of a boiling water type comprising an upper handle 1, a lower end portion 2 and a plurality of fuel units 3 stacked one above the other. Each fuel unit 3 comprises a plurality of fuel rods 4 arranged in parallel and in spaced relationship to each other in a given lattice. Further, each fuel unit 3 comprises a top tie plate 5 and a bottom tie plate 6 for attachment of the fuel rods 4 in their respective positions in the lattice. The fuel units 3 are stacked on top of each other in the longitudinal direction of the fuel assembly and they are stacked in such a way that the top tie plate 5 in one fuel unit 3 is facing the bottom tie plate 6 in the next fuel unit 3 in the stack and such that the fuel rods 4 in all the fuel units 3 are parallel to one another. A fuel rod 4 contains fuel in the form of a stack of fuel pellets 7b of uranium arranged in a cladding tube 7a. The cladding tube 7a is suitably made of a zirconium-base alloy or an alloy which, in addition to zirconium, comprises niobium, iron, tin and chromium. A coolant is adapted to flow from below and up through the fuel assembly.

Figure 2:
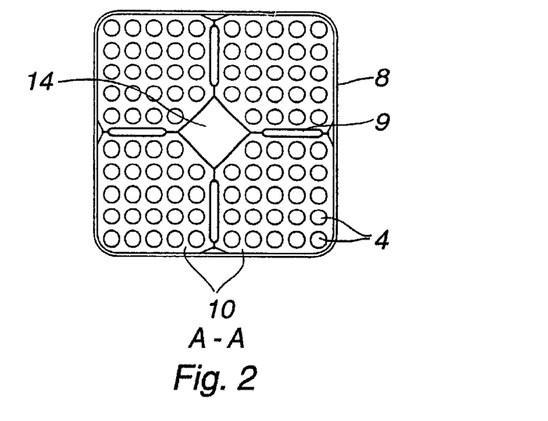
FIG. 2 shows a section A—A of the fuel assembly in FIG. 1.

FIG. 2 shows that the fuel assembly is enclosed in a fuel channel 8 with a substantially square cross section. The fuel channel 8 is provided with a hollow support member 9 of cruciform cross section, which is secured to the four walls of the fuel channel 8. In the central channel 14 formed of the support member 9, moderator water flows. The fuel channel with support members surround four vertical channel-formed parts 10, so-called sub-channels, with an at least substantially square cross section. The four sub-channels each comprises a stack of fuel units 3. Each fuel unit 3 comprises 24 fuel rods 4 arranged in a symmetrical 5×5 lattice.

The fuel assembly in FIG. 2 comprises 10×10 fuel rod positions. By a fuel rod position is meant a position in the lattice. All the fuel rod positions in the lattice need not be occupied by fuel rods 4. In certain fuel assemblies, a number of fuel rods 4 are replaced by one or a plurality of water channels. The introduction of a water channel changes the number of fuel rods 4 but not the number of fuel rod positions.

Figure 2A:
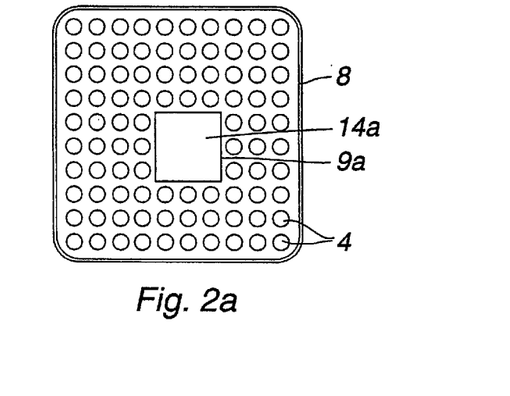
FIGS. 2a and 2b show alternative embodiments of a fuel assembly of the same type as that shown in FIG. 1 in a section corresponding to the section A—A of the fuel assembly in FIG. 1.

FIG. 2a shows an alternative embodiment of a fuel assembly according to the invention. FIG. 2a shows a horizontal section through the fuel assembly which is provided with an internally arranged vertical channel 14a through which water is conducted in a vertical direction from below and upwards through the fuel assembly. The channel 14a is surrounded by a tube 9a with a substantially square cross section. The fuel units 3 are kept in position by being fitted onto the tube which surrounds the vertical channel 14a.

Figure 2B:
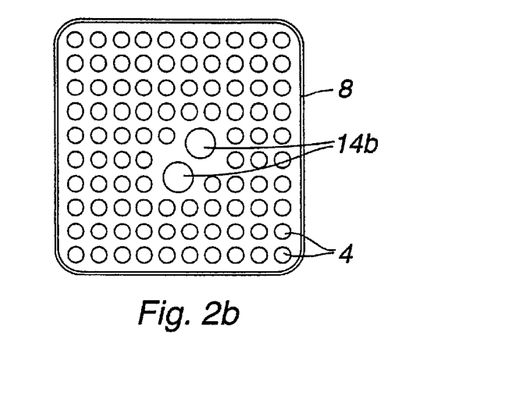

FIG. 2b shows an additional embodiment of a fuel assembly according to the invention. The figure shows a horizontal section through the fuel assembly which is provided with two centrally arranged vertical water rods 14b through which water is conducted from below and upwards through the fuel assembly. The water rods 14b have a diameter which is somewhat larger than the diameter of the fuel rods 4 and are formed with a substantially circular cross section. The fuel units 3 are kept in position by being fitted onto the water rods 14b.

Figure 3:
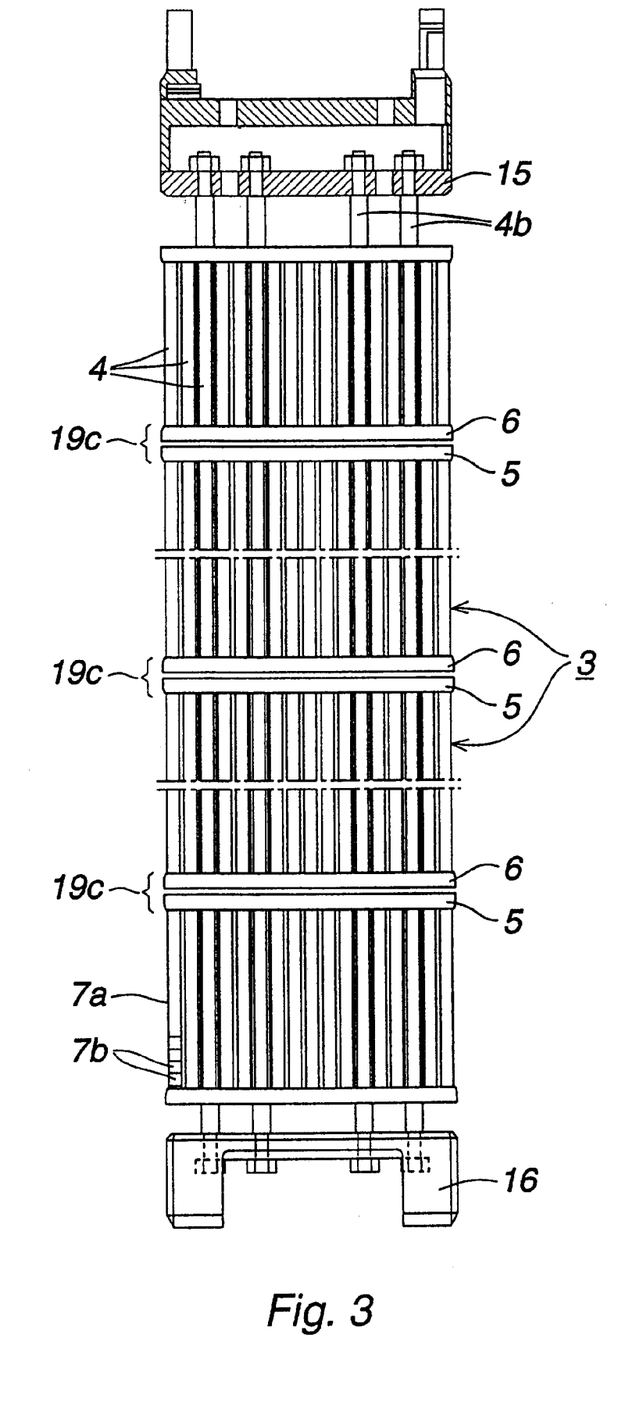
FIG. 3 shows in a vertical section a fuel assembly of pressurized-water type with short fuel units.

FIG. 3 shows a pressurized-water fuel assembly of square cross section. In the same way as the fuel assembly in FIG. 1, it comprises a plurality of fuel units 3 stacked on top of each other. Each fuel unit 3 comprises a plurality of fuel rods 4 arranged in parallel and in spaced relationship to each other in a given lattice. Each fuel unit 3 further comprises a top tie plate 5 and a bottom tie plate 6 for attachment of the fuel rods 4 in their respective positions in the lattice. The fuel units 3 are stacked on top of each other in the longitudinal direction of the fuel assembly and they are stacked in such a way that the top tie plate 5 in one fuel unit 3 is facing the bottom tie plate 6 in the next fuel unit 3 in the stack, and such that the fuel rods 4 in all the fuel elements 3 are parallel to each other. A fuel rod 4 contains fissionable material in the form of a stack of fuel pellets 7b of uranium arranged in a cladding tube 7a. A coolant is adapted to flow from below and upwards through the fuel assembly. A number of so-called control rod guide tubes 4b are arranged extending through the whole fuel assembly. The control rod guide tubes 4b are intended to receive finger-shaped control rods (not shown) which are inserted into and withdrawn from, respectively, the guide tubes 4b for the purpose of controlling the power of the nuclear reactor. The guide tubes extend between a top part 15 and a bottom part 16. The top part 15 is arranged above the uppermost fuel unit 3 in the fuel assembly and the bottom part 16 is arranged below the lowermost fuel unit 3 in the fuel assembly. The fuel units 3 are kept in position by being fitted onto the control rod guide tubes 4b.

Figure 4:
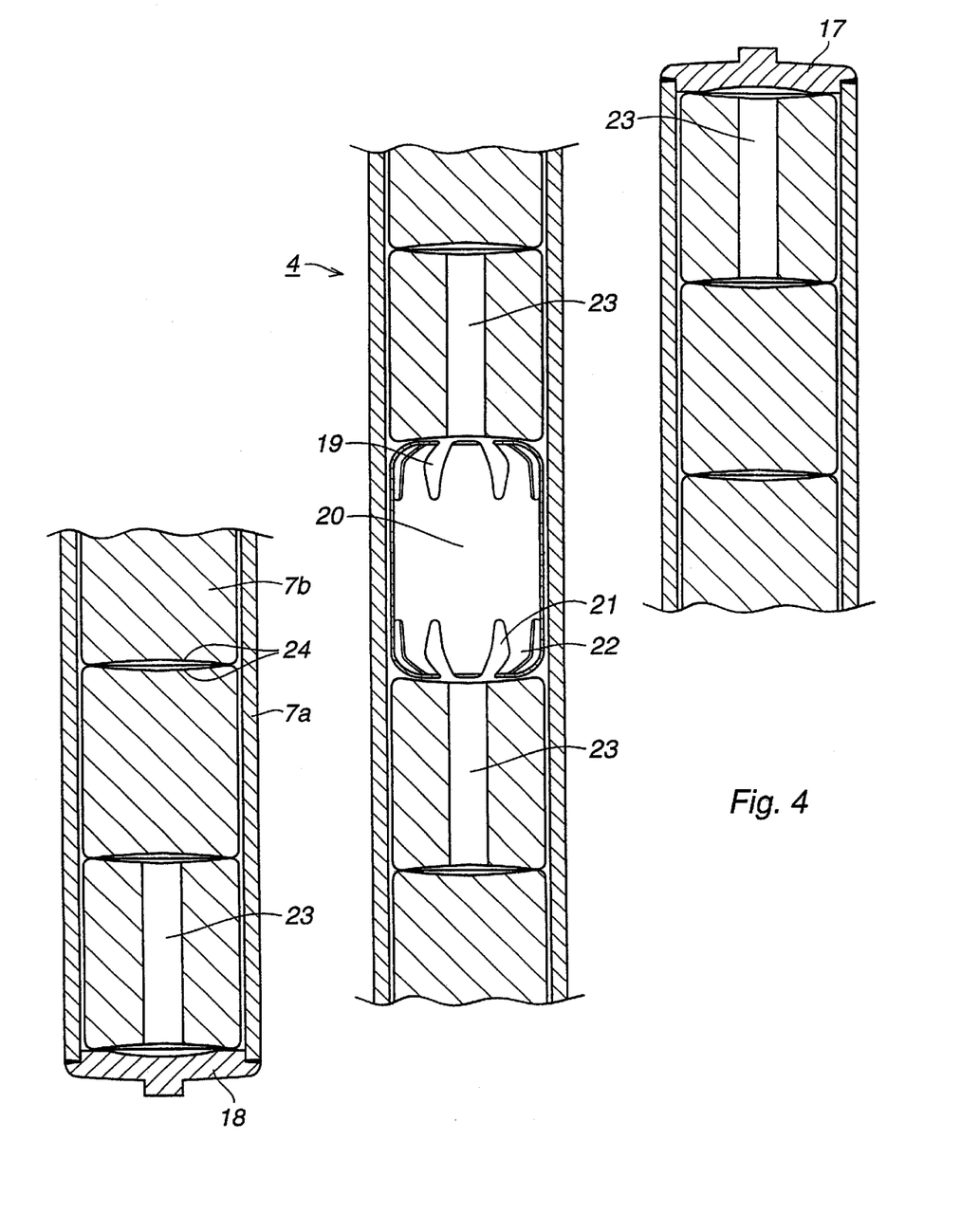
FIG. 4 shows a fuel rod for a fuel unit according to FIG. 1 or 2 with a spacer arranged in an axial gap.

FIG. 4 shows a fuel rod 4 for a fuel assembly according to FIG. 1 or FIG. 3. The fuel rod 4 comprises, as mentioned above, a cladding tube 7a and a stack of fuel pellets 7b arranged in the cladding tube. At the top, the cladding tube 7a is sealed with a top plug 17 and at the bottom with a bottom plug 18. The fuel rod 4 is formed with an inner cavity, an axial gap 19, in which fission gases may accumulate. The axial gap 19 is also intended to permit thermal expansion of the column of fuel pellets 7b.

A spacer 20 made of a zirconium-base alloy is arranged in the column of fuel pellets 7b to achieve the axial gap 19 at the desired level in the fuel rod. The axial gap 19 is arranged such that at least one fuel pellet 7b is arranged between the axial gap and either the top plug 17 or the bottom plug 18 of the fuel rod 4. The spacer 20 is formed as a sleeve with V-shaped slits 21 arranged in the respective ends. The outer parts of the tongues 22 formed between the slits are bent in towards the center of the spacer 20 at an angle of the order of magnitude of 100°. The spacer 20 is adapted to make contact, by its upper end, with a lower end of a fuel pellet 7b and, by its lower end, to make contact with an upper end of a fuel pellet 7b. This design of the spacer 20 permits the spacer to be deformed in the axial direction when the fuel pellets 7b because of thermal expansion grow in the axial direction. When the spacer 20 is deformed, it will make contact with the inner surface of the cladding tube 7a. This means that the pellets column across such a spacer 20, because of its friction against the cladding tube, also when the pellets 7b shrink due to densification, is retained in its position. In this way, axial gaps 19 are prevented from forming between the top plug 17 and the fuel pellet 7b arranged at the top of the column.

The spacer 20 may, of course, be formed in many different ways. It may, for example, be provided with an edge, folded towards the center, without slits 21. Alternatively, it may be formed as a spiral spring. It may also be suitable to arrange different types of spacers 20 in different parts of the fuel rod 4, for example non-deformable spacers 20 in certain axial gaps 15a.

In FIG. 4, it is indicated that the pellet 7b arranged at the top and bottom of the fuel rod 4, as well as the pellets 7b arranged adjacent the spacer 20, are made with throughholes 23. With this embodiment, the maximum temperature in the fuel pellets 7b may be reduced in the region where power peaks due to good moderation arise. At the same time, the amount of released fission gas may be reduced and space for accumulation of released fission gases be created in the pellets 7b. Further, the fuel pellets 7b are provided with cupped upper and lower end surfaces (see reference numeral 24). Because of the thermal expansion, the fuel pellets 7b grow more in the central, warmer parts than in the outer, colder parts. The cup shape 24 thus permits thermal expansion to a certain extent before the axial gap 19 is utilized for this purpose. Because of the hollowed 23 and cup-shaped 24 pellets 7b, a smaller axial gap 19 is sufficient for the thermal expansion and for accumulation of the released fission gases.

Alternatively, fuel pellets 7b with lower enrichment may be used adjacent the spacers 20. This has, in principle, the same effect as hollowed pellets when it comes to limiting power peaks, however, not with regard to reducing the power at the center of the fissionable material or accumulating fission gases.

Figure 5A:
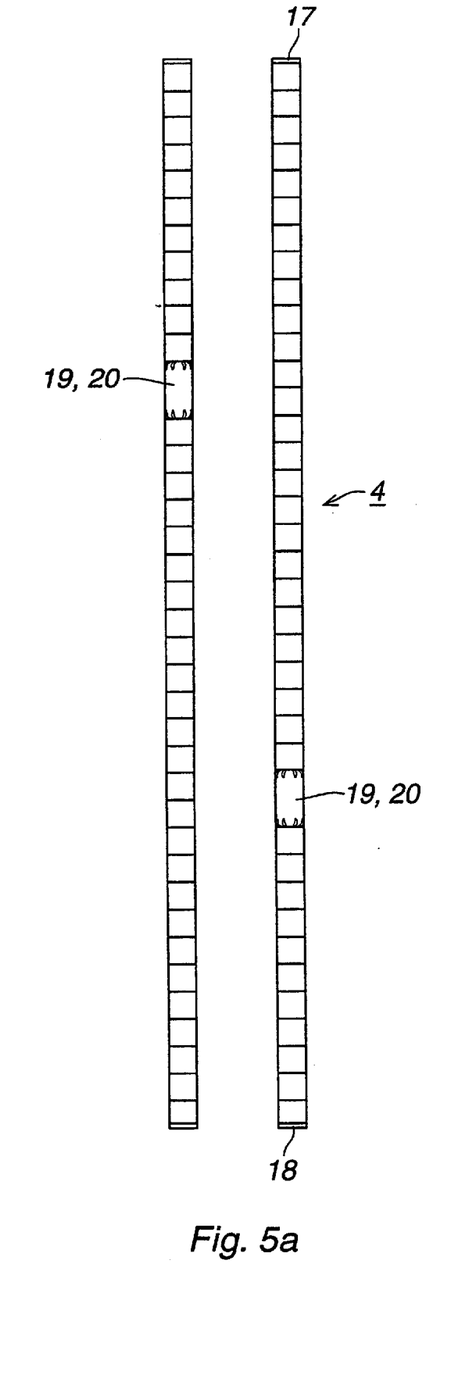
FIG. 5a shows two adjacently located fuel rods, each with an axial gap, wherein the axial gaps are arranged at axially separate levels.

FIG. 5a shows two fuel rods 4 arranged adjacent to each other, each with an axial gap 19. The axial gaps 19 in the two adjacently arranged fuel rods 4 are arranged at axially separate levels. Arranging axial gaps 19 at axially separate levels in adjacently located fuel rods 4 results in an equalization of the power along the fuel rod 4 and a reduced risk of high power peaks as a result of too good moderation in these regions which lack fissionable material 7b.

In an alternative embodiment, an axial gap 19 is arranged at random in the fuel rod 4 during the manufacture. It is then suitable to determine in advance a region within which the location of the axial gap 19 may be varied. The random location of the axial gap 19 may, for example, be achieved with the aid of a conventional random number generator.

Figure 5B:
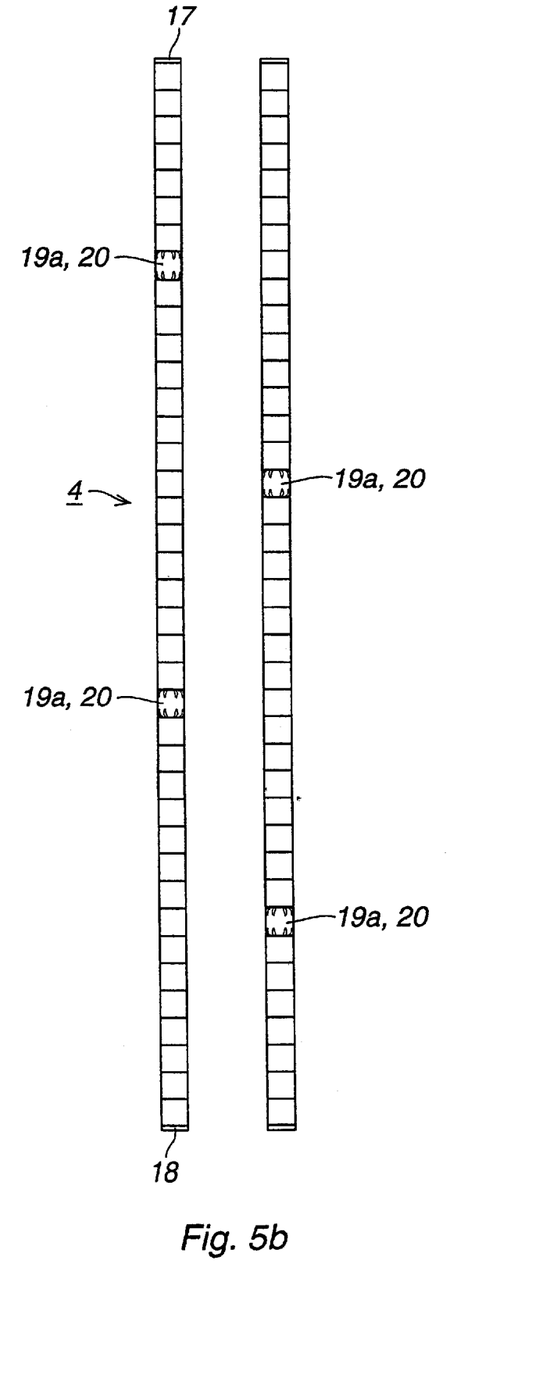
FIG. 5b shows two adjacently located fuel rods, each with two axial gaps, wherein all the axial gaps are arranged at axially separate levels.

FIG. 5b shows an alternative embodiment of the fuel rod 4 according to FIG. 5a. The axial gap 19 is here divided into two smaller axial gaps 19a in each fuel rod 4. The axial gaps 19a are arranged at different axial levels in the respective fuel rods 4.

The fuel rods 4 in FIG. 5a and FIG. 5b are designed preferably identical, but when putting these together into a bundle for a fuel assembly, every other fuel rod 4 is placed upside down.

Figures 6A, 6B:
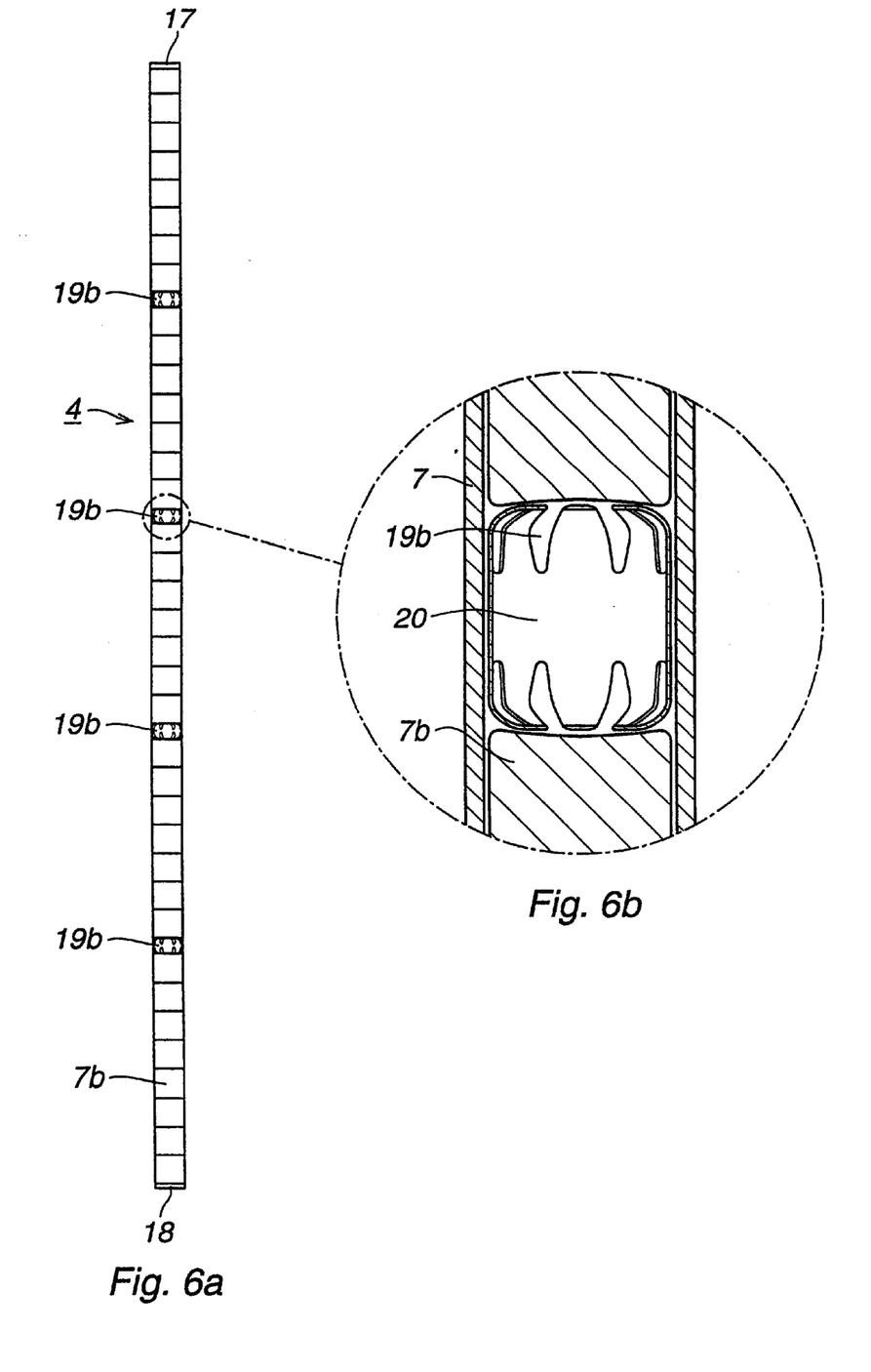
FIG. 6a shows a fuel rod with a plurality of axial gaps distributed along their axial length.
FIG. 6b shows a detail of FIG. 6a, wherein a spacer is arranged in an axial gap.

FIG. 6a shows another alternative embodiment of the fuel rod 4. In this fuel rod 4, the axial gap 19 is divided into four smaller axial gaps 19b arranged at axially separate levels. In this case, fuel pellets 7b without through-holes 23 may be used. In FIG. 6b, a spacer 20 is shown which is adapted to such a short axial gap 19b.

A fuel assembly which has a length of the order of size of 400 millimeters is provided with a gap which is 20–30 millimeters, alternatively two gaps which are each of the order of size of 10 millimeters, etc.

Figure 7A:
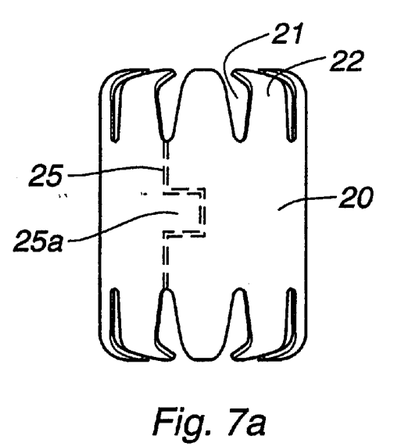
FIG. 7a shows a spacer in a view from the side.
Figure 7B:
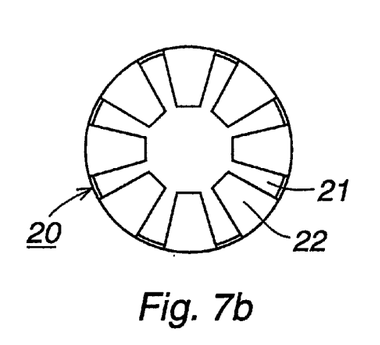
FIG. 7b shows the spacer according to FIG. 7a in a view from above.

FIGS. 7a and 7b show an alternative embodiment of the spacer 20. This spacer 20 is formed by punching a sheet and forming the sheet into a sleeve and folding the tongues 22 inwards towards the center of the sleeve. The dash-lined slit 25 shown in the figure indicates where the ends of the sheet meet. By forming the slit 25 with a hook 25a, the spacer 20 may be given a stable design in the axial direction. This spacer 20 is simple to manufacture since it is punched out in a piece of sheet, whereafter it is formed into a sleeve.

Figure 8:
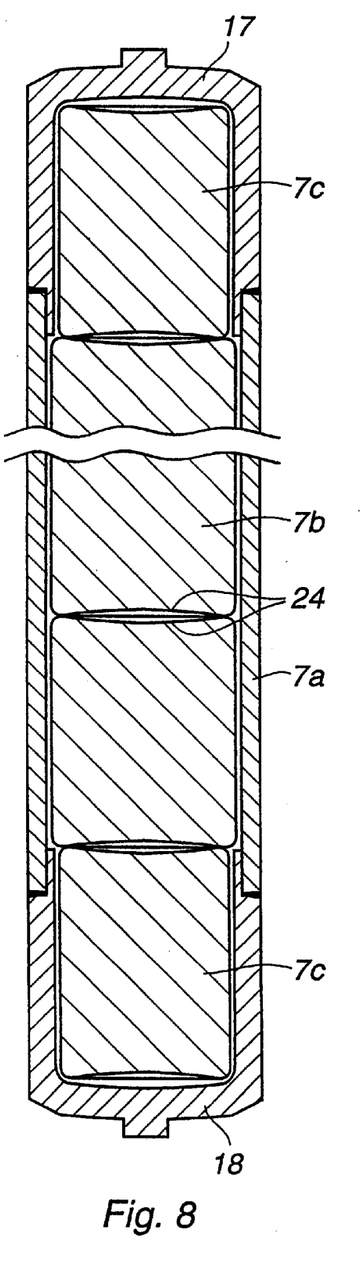
FIG. 8 shows a fuel rod with an upper and a lower end pellet with a smaller diameter than the other fuel pellets and a top plug and a bottom plug, respectively, which are intended to surround the end plugs.

FIG. 8 shows an embodiment of a fuel rod 4 with an upper and a lower end pellet 7c with a smaller diameter than that of the other fuel pellets 7b. Because of this arrangement, the power peaks at the axial gap between fissionable material 7b which is formed between two fuel units stacked on top of each other may be reduced (see reference numeral 19c in FIGS. 1 and 3, respectively). To prevent gaps from arising between the fuel pellet 7c and the top plug 17 and the bottom plug 18, respectively, the material surrounding the end pellet 7c is made with a correspondingly smaller inner diameter. In FIG. 8, the top plug 17 and the bottom plug 18, respectively, are provided with a larger thickness of material in relation to the cladding tube 7a. The material around the end pellet 7c may, of course, be provided with a correspondingly smaller inner diameter in some other manner than with the aid of the top plug 17 and the bottom plug 18, respectively; for example, the cladding tube 7a itself may be designed in this way.

What is claimed is:

1. A fuel assembly for a light water reactor, thee fuel assembly comprising:

more than two fuel units stacked one above the other, each unit comprising a top tie plate, a bottom tie plate, and a plurality of fuel rods extending between the top tie plate and the bottom tie plate, each fuel rod comprising a column of fissionable material and a cladding tube having a first end and a second end, the cladding tube surrounding the fissionable material, wherein at least two fuel rods are provided with at least two respective axial gaps in the fissionable material, wherein fissionable material is arranged on both sides of at least one of the axial gaps in said two fuel rods, and wherein said axial gaps are arranged at different axial levels in said two fuel rods.

2. The fuel assembly according to claim 1, further comprising:

an upper handle and a lower end portion, the column of fissionable material being arranged therebetween.

3. The fuel assembly according to claim 1, wherein the at least two respective axial gaps are arranged at different axial levels in adjacent fuel rods.

4. The fuel assembly according to claim 1, further comprising:

fissionable material having a smaller diameter than a main part of the fissionable material, wherein the fissionable material having the smaller diameter is arranged at a first and/or second end of the cladding tube, and wherein the end of the cladding tube where the fissionable material having the smaller diameter is arranged is provided with a correspondingly smaller inner diameter.

5. The fuel assembly according to claim 1, wherein the fissionable material comprises pellets of nuclear fuel, and wherein pellets arranged close to the axial gap and/or at the first or second end of the cladding tube are provided with through-holes or with lower enrichment.

6. The fuel assembly according to claim 1, wherein the fuel assembly has a substantially square cross-section.

7. The fuel assembly according to claim 1, further comprising:

a spacer arranged in each of the at least two respective axial gaps separating fissionable material arranged above and below the spacer, the spacer being resilient in the axial direction.

8. The fuel assembly according to claim 7, wherein the spacer is deformable or non-deformable.

9. The fuel assembly according to claim 7, wherein the spacer comprises a sleeve having a top end and a bottom end, V-shaped slits at the top end and the bottom end of the sleeve, tongues between the slits, the tongues being folded inwards towards a central part of the spacer at an angle of 100°.

10. The fuel assembly according to claim 7, wherein the spacer contacts an inner surface of the cladding tube and through friction against the cladding tube axially fixes the fissionable material arranged thereabove.

11. The fuel assembly according to claim 7, wherein the spacer comprises a zirconium-based alloy.

* * * * *